June 29, 1954 R. C. CARLSON 2,682,412

PHONOGRAPH RECORD PLAYER

Filed Aug. 9, 1949 7 Sheets-Sheet 1

INVENTOR.
Reuben C. Carlson
BY
J. D. Douglass
Att'y.

INVENTOR.
Reuben C. Carlson
BY
J. D. Douglas
Atty.

PHONOGRAPH RECORD PLAYER

Filed Aug. 9, 1949 7 Sheets-Sheet 3

INVENTOR.
Reuben C. Carlson
BY
J. W. Douglas
Att'y

INVENTOR.
Reuben C. Carlson
BY
J. D. Douglas
Att'y

INVENTOR.
Reuben C. Carlson
BY
J. D. Douglas
atty.

June 29, 1954 R. C. CARLSON 2,682,412

PHONOGRAPH RECORD PLAYER

Filed Aug. 9, 1949 7 Sheets-Sheet 6

INVENTOR.
Reuben C. Carlson
BY
J. D. Douglas
Atty.

INVENTOR.
Reuben C. Carlson
BY
J. D. Douglas
Att'y.

Patented June 29, 1954 2,682,412

UNITED STATES PATENT OFFICE 2,682,412

PHONOGRAPH RECORD PLAYER

Reuben C. Carlson, Chicago, Ill., assignor to Admiral Corporation, Chicago, Ill., a corporation of Delaware Application August 9, 1949, Serial No. 109,266

15 Claims. (Cl. 274—10)

This invention relates to phonograph mechanisms and particularly to phonograph record player mechanisms which are adapted to play a stack of either of two classes of records automatically.

The development of fine groove or microgroove phonograph recording is responsible for two new classes of disc type records. Although their diameters are the same, they differ according to the size of their center holes, their terminal or trip grooves, the rate at which they are rotated for reproduction and the contour of their cross-section. For example, a record of one of the classes has a center hole approximately $\frac{9}{32}$ of an inch in diameter, an eccentric terminal groove, and is played at a speed of 33⅓ R. P. M. A record of the other of the classes is provided with a 1½ inch diameter center hole, a spiral terminal groove, and is played at a speed of 45 R. P. M. Furthermore, a record of the latter class varies in thickness according to the distance from its axis.

In view of the foregoing differences, a different record player was previously necessary to reproduce each of the classes of records. Also a special pickup arm mechanism was necessary to play the records since microgroove records are adapted to be engaged by a transducer needle at a pressure of but a fraction of the needle pressure ordinarily employed with conventional records; that is, records of the older type which are adapted to be operatively reproduced when rotated at a speed of 78.26 R. P. M.

By means of my novel record player, I am able to reproduce both of the foregoing classes of records effectively on one machine. This I am able to do by providing a removable shouldered spindle, to afford with an ejector head of simplified construction, magazine support for records having the small size of center hole.

When the spindle has been removed from its support, a large diameter center post is adapted to be removably attached to the turntable. Records having the larger size of center holes are adapted to be threaded over the center post which affords support for the records since it carries movable record support members to provide magazine means by which a supply of these records is adapted to be carried above the level of the turntable.

Most of the operations of automatically manipulating a special pickup arm and actuating the respective magazine means are carried out by operation of a simple swingable element which may be struck from sheet metal. The plate is of unitary construction and consequently inexpensive of manufacture. It is also easy to install and readily removed and replaced if occasion demands. By use of the swing plate, I have produced a record player requiring fewer parts for its successful operation and, in addition, capable of automatically reproducing either of the new classes of records.

Other advantages of the invention will be apparent from the following specification when considered in conjunction with the accompanying drawings in which.

Figure 1:
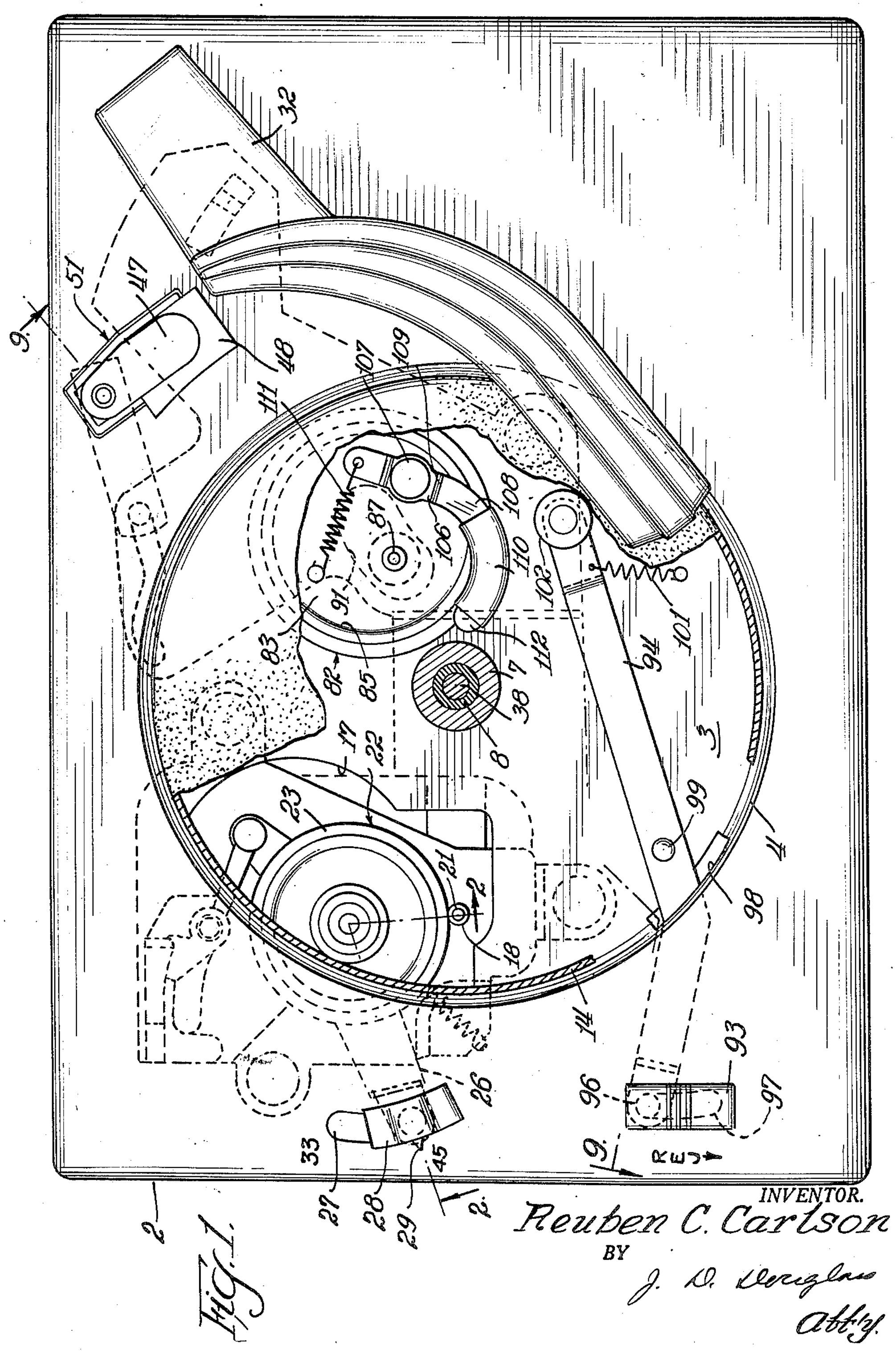
Fig. 1 is a top plan view of the improved record player, parts being broken away to reveal the structure of other parts.

In the drawings wherein for the purpose of illustration is shown one embodiment of the invention, the reference character 2 is used to denote a base or chassis plate in its entirety of which a lower offset wall 3 is spaced from the upper surface of the base plate by a cylindrical wall 4 to provide a well 5 in which is received the lower portions of a turntable 6. Turntable 6 (Fig. 5) has a hub 7 extending downwardly. The hub is journalled on a sleeve 8, extending vertically and centrally of the wall 3 to which the sleeve is rigidly coupled by a socket 9. Socket 9 provides an annular recess 11, about sleeve 8, in which a ball bearing 12 is disposed between the hub 7 and socket 9, to facilitate rotation of the turntable, while vibration resistant washers 13 may be employed on either side of the ball bearing to isolate vibration created by means, later to be described, for driving the turntable.

Figure 2:
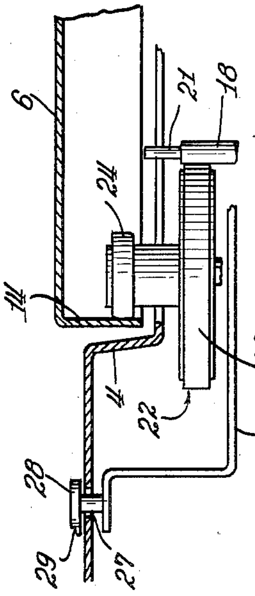
Fig. 2 is a vertical section taken on line 2—2 of Fig. 1.
Figures 10, 11:
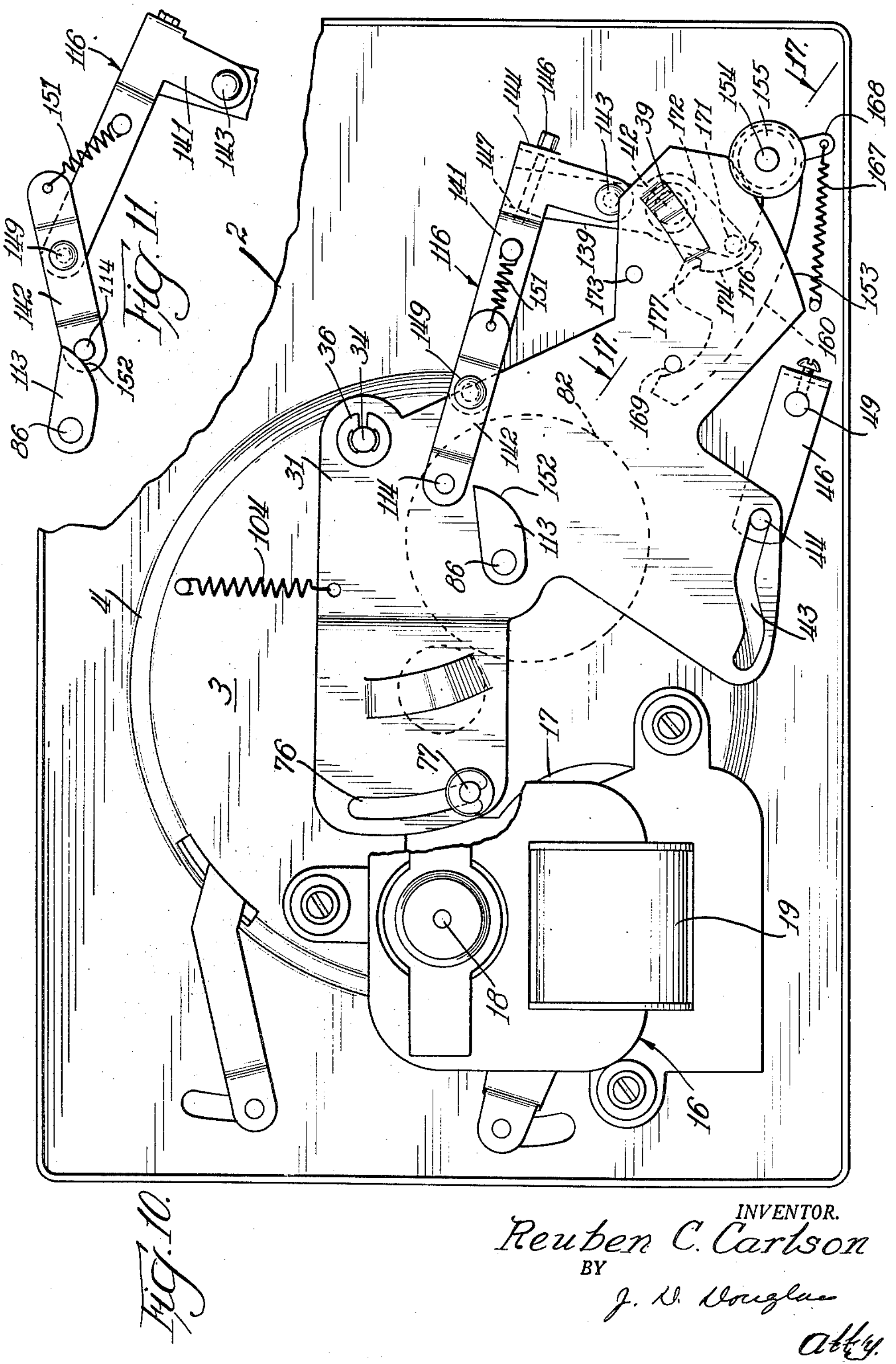
Fig. 10 is a bottom plan view of the record player, a corner thereof being broken away.
Fig. 11 is a bottom plan view of elements of the actuator mechanism in a position differing from the position they occupy in Fig. 10.

The turntable 6 includes, peripherally thereof, a depending flange 14 (Fig. 9) to which rotary motion is communicated from a motive unit which is indicated in its entirety by the character 16 (Fig. 10). The motive unit, per se, is, however, no part of the present invention; hence, it will not be described in detail. It is noteworthy, nevertheless, that unit 16 is mounted on the lower side of plate 2 below an aperture 17 in the offset wall 3. The motive unit includes a shaft 18 extending vertically through aperture 17 from a motor 19 which is an integral element of the unit 16. Shaft 18 has an end portion 21 (Fig. 2) of reduced diameter which may be engaged by a mobile or swingable idler 22 biased by spring means, not shown, into concurrent engagement with both the shaft 18 and turntable flange 14.

Mechanism, not shown, for swingable support of the idler also provides for movement of the idler 22 axially thereof so that a rubber surfaced step 23 thereon, of large diameter, is adapted to be moved longitudinally over shaft 18 and be driven thereby at a speed in accordance with the portion of the shaft engaged. At the same time a second and smaller rubber tired step 24, of idler 22, is drivingly maintained in engagement with the turntable flange 14. The turntable is thus adapted to be driven at speeds of 33⅓ R. P. M. and 45 R. P. M. respectively. Means by which the turntable speed is adapted to be controlled involves a lever 26 extending outwardly and upwardly from the motive unit 16, through a slot 27 in plate 2, and is surmounted by a handle 28 having a pointer 29 adapted to be moved to either of two calibrations, "33" and/or "45" on plate 2, to denote the speed at which the turntable will rotate in each of the respective positions.

Above the turntable separate magazine mechanisms, later to be described, provide support for stacks of either of the two classes of records in spaced relationship to the turntable to which the records are successively released. This operation is effected in response to cyclical movement of a swingable element or swing plate 31, below the offset wall 3. Also, in response to operation of swing plate 31, a pickup arm 32 is manipulated when one of either of the classes of records is rejected, i. e., the process of reproducing the record is discontinued. The swing plate 31 (Fig. 4) is of irregular formation and preferably stamped from sheet metal. Toward one corner thereof, the plate is provided with a bushing 33 rigidly connected thereto to provide a bearing for a shouldered pin 34 (Fig. 5) extending downwardly from the offset wall 3 with which the pin is in rigid association. The swing plate 31 is thus adapted to be swung about pin 34 through a horizontal plane in which it is retained by confining means including a C-washer 36, pinched about pin 34 at an annular recess 37 at the lower end of said pin, and a flange 35 on said pin.

At a point on plate 31, remote from bushing 33, is a vertically effective or lift cam 39 which includes a lowermost or dwell portion 41 against which a lift rod 42 is adapted to rest when the pickup arm is tracking a record. When, however, the record is rejected, the swing plate 31 is rotated, by mechanism later to be described, about pin 34 from the position shown in Fig. 4 to the position shown in Fig. 5, the lift rod 42 being thereby moved axially upward. This motion of rod 42 is concurrently communicated to pickup arm 32 to rock the pickup arm upward out of engagement with the record it has been tracking, assisted by other mechanism to be described hereinafter.

Figures 4, 5:
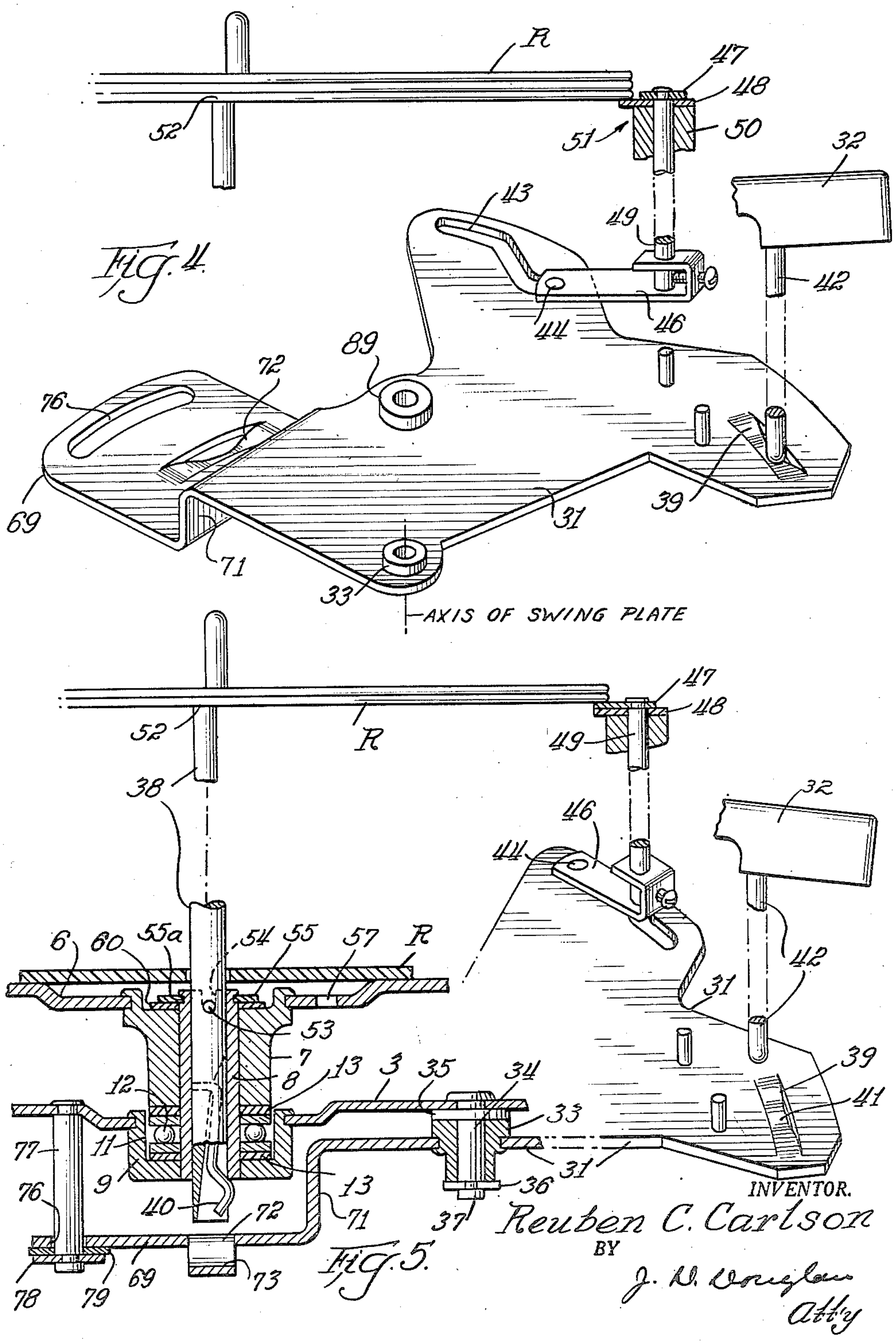
Fig. 4 is a diagrammatic view showing some elements in perspective and other elements in fragmentary side elevation.
Fig. 5 is also a diagrammatic view, corresponding to Fig. 4, portions of the swing plate having been shown partly in perspective and partly in vertical section and enlarged, it also having been rotated to position different from that shown in Fig. 4.

Toward the extremity of another portion of plate 31, remote from the bushing 33, is a laterally effective cam or positive motion cam slot 43 in which is received a follower pin 44 carried at one end of a follower arm 46. The arm 46, at its other end, is rigidly coupled to a vertical shaft 49 which carries an ejector arm 47, superimposed on a stationary support plate 48. The plate 48, on the other hand, is supported against displacement by a column 50 (Fig. 9) fixed to base plate 2, and in which shaft 49 is journalled. Other mechanism, to be described hereinafter, constitute an ejector mechanism which, in its entirety, is identified by the character 51 (Fig. 1). The support plate 48 is adapted to cooperate with a shoulder 52 (Fig. 9) on a spindle 38 to provide magazine means for support of a stack of records R at their peripheral edges and center holes respectively as indicated. It will be noted, that when the pickup arm lift pin 42 (Fig. 4) is in engagement with the dwell 41 the follower pin 44 occupies a position at one end of the slot 43. The opposite end of slot 43 is farther from the bushing 33 than the end first alluded to so that as the swing plate is moved from the position in which it is indicated in Fig. 4 to its other extreme position, indicated in Fig. 5, follower pin 44 is carried away from the axis of the swing plate, and concurrently arm 47 moves the bottom record of stack R from the support of both shoulder 52, on the spindle, and the support plate 48 so that the record is enabled to slide by its own weight down the spindle until it comes to rest on the turntable 6. The swing plate 31 is then rotated back to its Fig. 4 position, thus allowing another record of the stack R to rest on the spindle shoulder 52 and ejector support plate 48.

The spindle 38 is removably supported by the sleeve 8 wherein it is retained against forces tending to rotate it and move it downward, from the position indicated (Fig. 5), by a pin 53 extending from one side of the spindle and received in a notch 54 at one side of the upper end of sleeve 8. Additionally, the upper end of sleeve 8 passes through a washer 60 which is confined between the hub 7 and a C-washer 55 pinched about sleeve 8 at an annular recess 55[a], the washers serving to resist forces tending to lift the turntable from its bearing. To afford resistaance to too ready displacement of spindle 38, axially thereof, from the sleeve 8, as when an accumulation of played records are lifted from the turntable and out of engagement with the spindle, the lower end of said spindle is provided with a resilient retention device which includes a deflection spring 40 and which is constructed in accordance with the disclosure of a copending application of James E. Vistain, Jr., filed on June 15, 1949, Serial No. 99,191.

Figures 6, 7, 8:
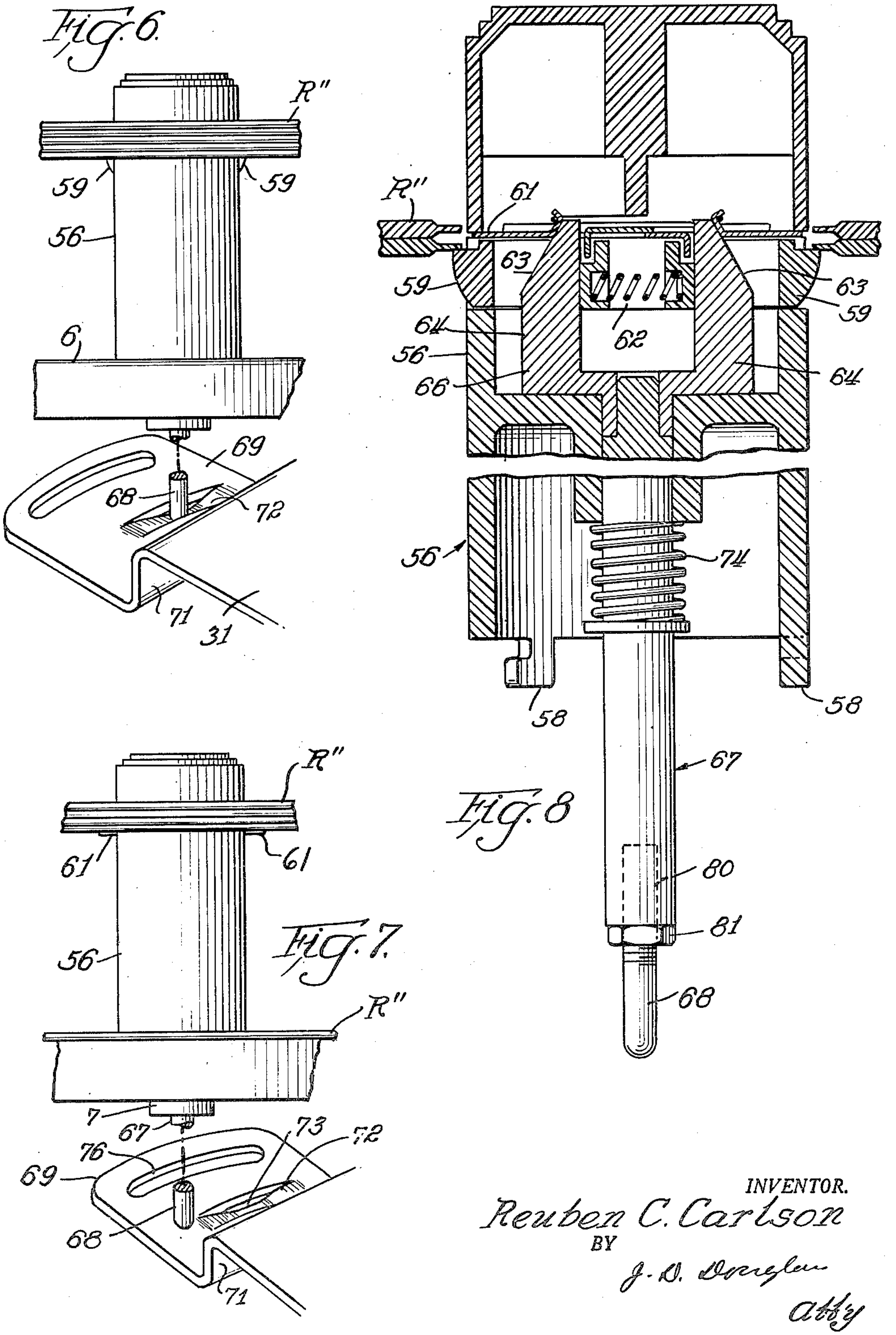
Fig. 6 is another diagrammatic view showing the portion of the swing plate which is adapted to operate the center post.
Fig. 7 is a view corresponding to Fig. 6, parts being in a different position.
Fig. 8 is a view of the center post, in side elevation, parts being broken away to reveal the structure of underlying parts.

In order that records R'' of the other or alternative class; that is, the records having 1½ inch diameter center holes, may be reproduced the spindle 38 is removed from sleeve 8 and a center post 56 is attached to the turntable. The post 56 will not be described in detail since its structure per se has been fully disclosed in the aforesaid copending application of James E. Vistain, Jr. It is noteworthy, however, that in order to support the center post in an operative position, the turntable 6 is provided with a series of apertures 57 (Fig. 5) arcuate of the axis of said turntable and adapted to receive hooks 58 (Fig. 8) on the lower end of the center post in order that said center post may be releasably coupled to the turntable. Records R'', in a stack, are threaded over the center post 56 and retained in spaced relation to the turntable 6 by magazine means comprising a pair of normally extended but retractable record support members 59 (Fig. 8). When the swing plate 32 is operated, a pair of record blades 61, which are normally retracted within the center post, are extended between the bottom record of the stack supported by members 59 and the record immediately above said bottom record. This operation provides a support for the records above the bottom record, which is independent of the support afforded by members 59. Once support is thus established by the blades 61, the members 59 start to retract while concurrently blades 61 continue their outward extension. At a point where the members 59 are retracted sufficiently to afford no support for the bottom record R'', it drops to the support of turntable 6.

In Fig. 8 is indicated the relationship between the blades 61 and the members 59. A compression spring 62, between members 59 biases them to their Fig. 6 position. Each of the blades 61 is biased to its position inwardly of the center post by suitable spring pressure but is adapted to be forced outwardly of the center post by vertical motion of cam 63 on the respective arm 64 of a bifurcated member 66, the same being an element of a reciprocatory mechanism 67. Each blade 61 is loosely coupled to the member 59 on the opposite side of the center post to provide inverse direction of motion for the blades and support members respectively. The mechanism 67 includes a follower rod 68 which, when center post 56 is operatively coupled to turntable 6, extends downwardly through sleeve 8 in order that it may cooperate with the swing plate.

In order that horizontal motion of swing plate 31 may impart vertical motion to the rod 68, for release of a record to the turntable, the swing plate bears an additional arm 69 which is offset by a vertical portion 71 so that said arm is adapted to extend under the socket 9. Directly below the sleeve 8, arm 69 bears a escond lift cam or vertically effective cam 72 which includes a lowermost or dwell portion 73 with which the lower extremity of rod 68 is in association when the pickup arm 32 is tracking a record.

When one of the records is rejected and plate 31 consequently starts a cycle of operation, the mechanism 67 is lifted by cam 72, as will be apparent on comparing Fig. 6 with Fig. 7. This operation is carried out against the resistance of the spring pressure previously alluded to in addition to another spring 74 which urges rod 68 downward.

The arm 69 is preferably provided with a slot 76, arcuate of the axis of plate 31, in which is received a stud 77 (Fig. 5), extending downward from wall 3, and about which a C-washer 78 is pinched, to resist vertical displacement thereof, a bearing washer 79 also being employed between the C-washer and arm 69. The contiguity of rod 68 to the cam dwell 73 is also adapted to be regulated by a threaded connection 80 including a lock nut 81 on the mechanism 67.

The swing plate 31 is adapted to be cyclically operated from the turntable hub 7 by means of a friction wheel or mobile wheel 82. It comprises a pair of discs 83 (Fig. 9) each of which is offset at 85 in opposite direction at its peripheral regions to provide support for a rubber tire 84. The discs are rigidly coupled to each other in any suitable manner and rigidly mounted on a vertical shaft 86, eccentrically of their centers, an upset portion 87 at the upper end thereof clamping the discs against a flange 88 also on the shaft. The shaft 86 is journalled in a bearing 89 which is fixedly mounted on the swing plate 31 and in extension upwardly through a slot 91 in wall 3. If desired, the shaft 86 may be confined against forces tending to move it upwardly by means of a C-washer 92 pinched about the periphery of said shaft at the lower extremity of the bearing 89. Wheel 82 (Fig. 1) is shown in the position it occupies when the pickup arm 32 is tracking a record. In this position, as will be noted, the shaft 86 is nearest the turntable hub 7 from which the wheel is spaced slightly so that there is no motion imparted to the wheel by the turntable. Friction between shaft 86 and bearing 89 is just adequate to overcome the inertia of rotation when the wheel becomes disengaged from the turntable hub and is adequate to retain wheel 82 in the position indicated.

The wheel 82 is adapted to be drivingly coupled to the hub 7 manually and/or automatically. Means for manually initiating driving engagement of wheel 82 and hub 7 involves use of a handle 93 (Fig. 1) beside the turntable. The handle 93 is coupled to one end of a lever 94 by a stud 96 in extension through an arcuate slot 97 in base plate 2. The lever 94 further extends from under plate 2, through an aperture 98 in the wall 4 and over the offset wall 3 to which it is swingably coupled by a pivot member 99. Lever 94 is then biased clockwise (Fig. 1) about member 99 by a tension spring 101. When stud 96 is moved toward the end of slot 97, against the force of spring 101, a follower roller 102, on the end of lever 94, is carried into engagement with the periphery of wheel 82 causing said wheel to rotate counterclockwise (Fig. 1) until it is engaged by the turntable hub 7 for driving communication therewith. The driving communication is further augmented by a knurled surface 103 (Fig. 9), on the hub 7, and a tension spring 104 (Fig. 10), anchored to the swing plate 31 and wall 3, the spring tending to resist movement of said swing plate from the position in which it is indicated.

During rotation of the wheel 82, the eccentric mounting for the wheel causes the swinging movement of the swing plate which swings counterclockwise about pin 34 (Fig. 10) against the resistance of spring 104 for approximately half of its motion after which plate 31 is gradually returned to its normal position by swinging clockwise due to the force of the spring assisted by driving coupling between wheel and hub.

Figure 9:
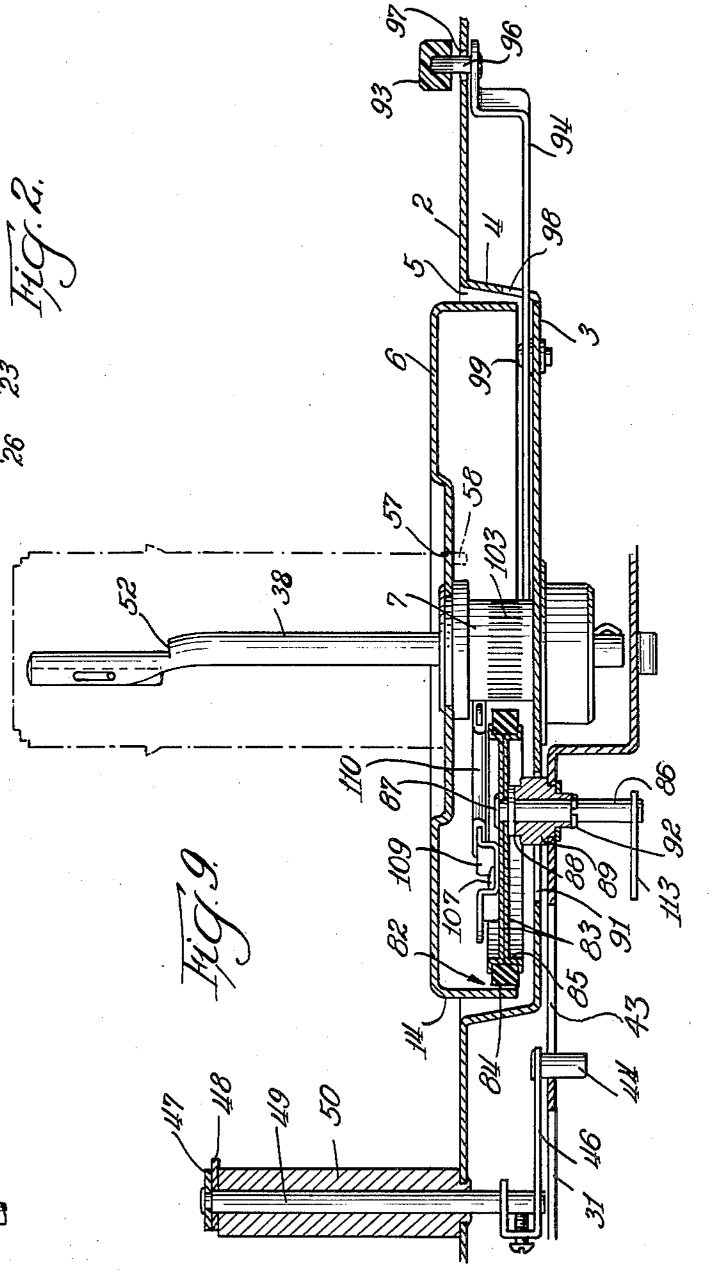
Fig. 9 is a vertical section on line 9—9 of Fig. 1.
Figure 3:
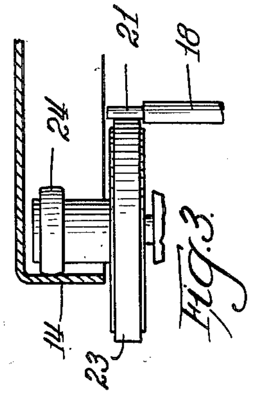
Fig. 3 is a view similar to Fig. 2, parts being in a different position of adjustment.

Means is provided to interrupt the motion of wheel 82 suddenly when the swing plate has been returned to its normal position. This is desirable in order to stop the wheel 82 regularly in a predetermined position, for a purpose later to be apparent, after the wheel has completed a cycle of operation. In detail this mechanism includes a lever or auxiliary drive member 106 (Fig. 1) which is pivoted at 107 to webs 83 of the wheel 82 adjacent one side thereof. The lever 106 has a curved arm 108 which includes an offset portion 109 so that the arm is adapted to extend over and beyond the periphery of the tire 84 (Fig. 9). Additionally, arm 108 is biased to the position indicated, its normal position, by a tension spring 111 anchored to the remaining end of lever 106 and one of the webs 83. Movement of lever 106 by spring 111 to a point beyond its normal position is resisted by engagement of the offset portion 109, of the lever, with the offset portion 85 of the wheel. From its offset portion 109 the arm 108 is curved and terminates in a free end 112. When the wheel 82 is rotated, the arm 108 is, of course, carried into engagement with the hub 7 for driving engagement therewith. The engagement is maintained by spring 111 and may be improved if arm 108 is surfaced with some resilient material. Convenient means for providing such a surface may take the form of a rubber sleeve 110 frictionally held on the arm. Once engagement of the arm 108 with hub 7 is established, it is so maintained even after the tire 84 is swung out of engagement with the hub and until free end 112 of the lever is carried out of engagement with the turntable hub.

In its operation of becoming automatically disengaged from hub 7, the arm 108 is assisted by the spring 111, and the direction of rotation of the turntable hub so that the disengagement is very sudden. As has been previously indicated, however, there is just enough friction in the bearings supporting wheel 82 to dampen inertia of the wheel so that it stops in a position approximately as shown in Fig. 1.

As previously indicated, the wheel is adapted to be moved automatically into engagement with the hub 7 for driving rotation thereby. This is effected when the needle-bearing end of the pickup arm 32 reaches the terminal groove of the record it is tracking. The mechanism by which this is carried out includes a crank arm or contactable arm 113 (Figs. 9 and 10) fixed to the lower end of shaft 86. Adapted to cooperate with the arm 113 is a contactor pin 114 which extends downwardly from an actuator or trip mechanism 116 which will be described hereinafter. It is noteworthy, however, that the actuator mechanism is adapted to swing about the axis of lift rod 42 (Fig. 10) and is so coupled to the pickup arm that mechanism 116 and arm 32 are adapted to swing laterally with each other. During the process of reproducing a record, of either class, the pin 114 is carried toward arm 113 which is also in a predetermined position determined by the auxiliary drive member 106 and hub 7 as previously indicated. When, however, pickup arm 32 is carried to the trip groove of the record it is tracking, pin 114 is concurrently carried counterclockwise (Fig. 10) into engagement with arm 113. The trip or terminal groove is adapted to swing arm 113, and consequently wheel 82 from its Fig. 1 position sufficiently to initiate driving relationship between said wheel and the turntable hub. This starts a cycle of movement of the swing plate 31 which is accompanied by movement of the actuator mechanism in an outward or clockwise direction.

Figures 12, 13:
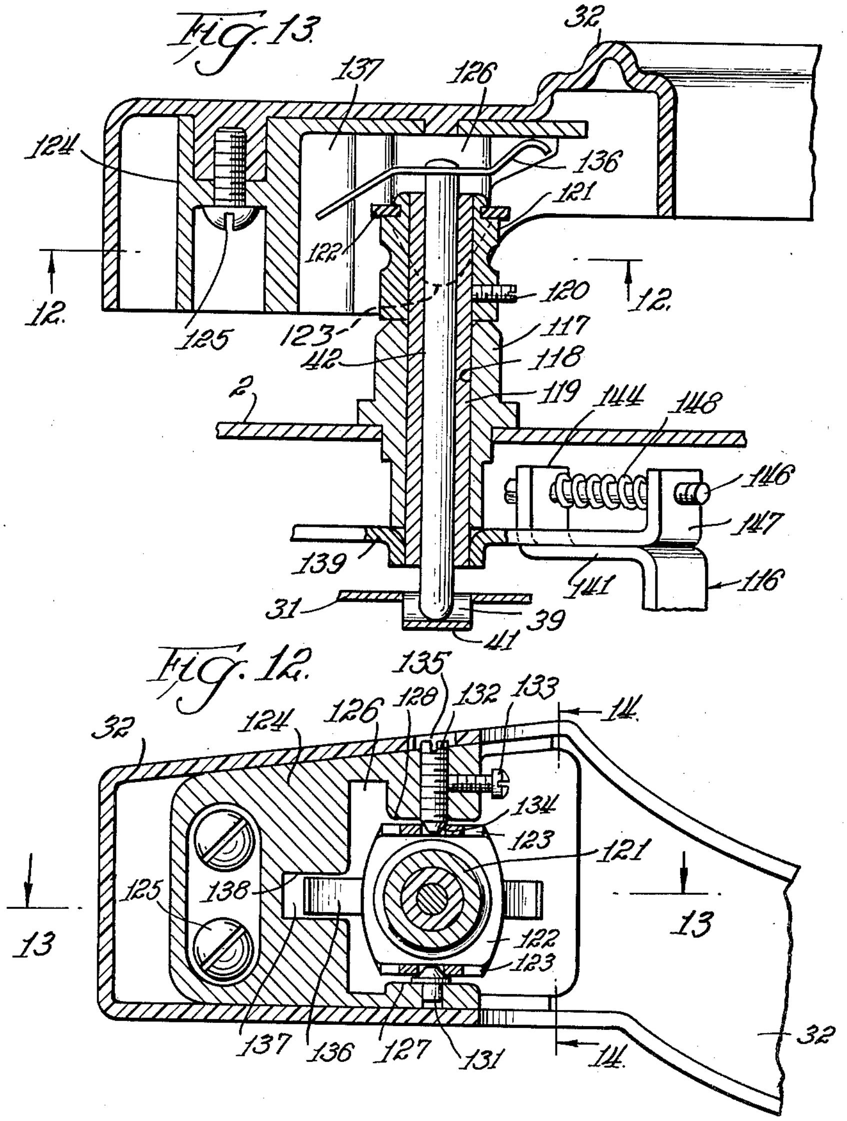
Fig. 12 is a horizontal section taken on line 12—12 of Fig. 13.
Fig. 13 is a vertical section on line 13—13 of Fig. 12.
Figure 14:
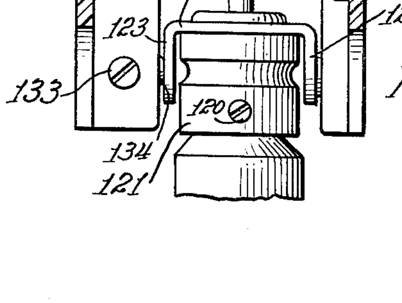
Fig. 14 is a horizontal section taken on line 14—14 of Fig. 12.

In order to understand the connection between pin 114 and the pickup arm 32 reference should be made to Fig. 13 wherein it will be noted that the base plate 2 supports a vertical bearing member 117 in a position immediately above the lift cam 39 on the swing plate. The bearing 117 extends through plate 2 to which it is rigidly fastened. Axially thereof, bearing 117 includes a bore 118 in which is journalled a sleeve 119 to the upper end of which a collar or carrier member 121 is adjustably clamped by a set screw 120 so that the height of sleeve 119 can be adjusted.

The lower end of collar 121 is adapted to rest on the member 117 with respect to which the collar is in bearing relationship. The upper end of collar 121 bears a flange 122, fixed thereto, which includes a pair of ears 123 extending downwardly therefrom in parallel relationship to each other, the arms also being beside collar 121. The pickup arm 32 is of substantially inverted U-shape in vertical cross section and bears a counterweight 124 coupled to the arm 32 in any convenient manner such as by screws 125. The counterweight 124 is recessed at 126 and provides a pair of opposed bosses 127 and 128 having vertical side walls. The ears 123 are disposed adjacent the walls 127 and 128. From the boss 127 a conical-ended pintle 131 extends into the opening in one of the ears 123 to provide a bearing support. The other bearing support is provided by a screw 132 that is threaded through the boss 128, the conical end of which is engaged in an opening in an ear 123. The position of this screw may be locked by a set screw 133 for changing the setting of screw 132, a suitable tool may be passed through a hole 135 in the pickup arm. The pickup arm is thus pivotally journalled on the pintle 131 and the screw 132. Rocking of the pickup arm is carried out by the lift pin 42 which is slidably journalled in sleeve 119. During reproduction of a record, the pickup arm is supported by the record it is tracking, and the pintle 131 and screw 132. Also, while the pickup arm is tracking a record, a contactor arm or lever 136 carried at the upper end of lift rod 42 is out of engagement with the pickup arm 32. When, however, the record is rejected, one end of contactor arm 136 is pressed upwardly against the ceiling of the recess 126 to swing the pickup arm upwardly about its horizontal axis. The remaining end of lever 136 extends into a slot 137, extending longitudinally of the pickup arm from the recess 126. Therein the intimacy of relationship between opposed walls 138 of slot 137 and lever 136 prevent its lateral displacement from a desired point of engagement with the ceiling of recess 126.

Figure 15:
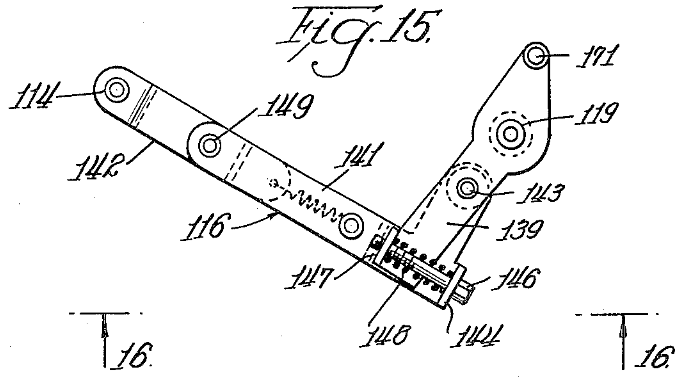
Fig. 15 is a top plan view of the actuator mechanism.
Figure 16:
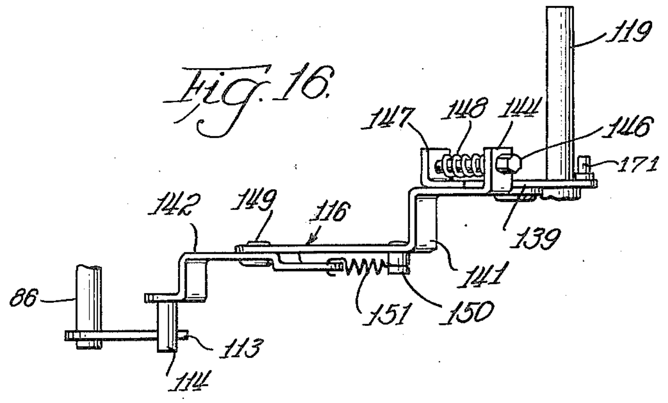
Fig. 16 is a side elevational view of the same from line 16—16 of Fig. 15.

Supported from the sleeve 119 is the actuator mechanism 116. It comprises a carrier arm 139 which is rigidly mounted on the sleeve 119, an adjustable arm 141 carried by arm 139 and a contactor or lever 142 from one end of which the pin 114 extends downward. The adjustable arm 141 is of L-shaped conformation and pivoted at one end thereof by a shoulder rivet 143 to the lower side of carrier arm 139. Also, the carrier arm 141 includes an ear 144 extending upward from one side thereof. A screw 146 in free extension through ear 144 is threaded in a second ear 147 extending upward from the swingable end of carrier arm 139. A compression spring 148 is coiled about screw 146 between the ears 144 and 147 and tends to turn lever 141 about pivot 143. This tendency is resisted by the screw 146 which is adapted to move lever 141 in the opposite direction to provide for angular adjustment of pin 114 with respect to the pickup arm to assure proper tripping of the mechanism when the pickup arm reaches the terminal groove of the record. The contactor lever 142 is pivoted at 149 to the adjustable arm 141 and biased to the position indicated (Fig. 15) by a tension spring 151, anchored to one end of arm 142 and a pin 150 on arm 141. Pin 114 is, as previously stated, carried by the offset end of the arm 142.

Should the cyclical motion of mechanism 116 be clockwise (Fig. 10), as when the pickup arm is moved outwardly from a point between the terminal groove of a record and the center hole thereof, it may be impossible for pin 114 to pass arm 113 without engagement therewith, especially if wheel 82 is drivingly coupled to the turntable hub. Under such circumstances, the obstruction offered by arm 113 merely causes lever 142 to be swung about pivot 149 (Fig. 11) against the resistance of spring 151 thereby enabling pin 114 to pass over the free end of arm 113. If desired, the arm 113 may have, at the free end and side thereof, a curvilinear surface or cam 152 to facilitate smooth passage of pin 114 thereover.

Figure 17:
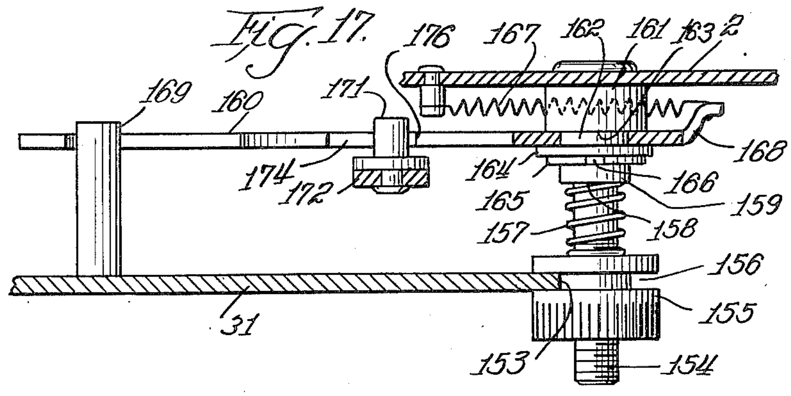
Fig. 17 is a section, drawn to an enlarged scale, taken on line 17—17 of Fig. 10.

Means are provided to regulate, within limits, the height to which the pickup arm 32 is adapted to be raised by motion of the cam 39. This is advisable in order that the pickup arm may be manipulated through a cycle of motion without interference with the records R when the same are supported by spindle shoulder 52 and ejector plate 48. Therefore, arcuate of its axis, the swing plate 31 includes an edge portion 153 (Figs. 10 and 17) beside which a stud 154 extends downward from the base plate 2. The stud is threaded to receive a nut 155 which is provided with an annular groove 156 in which the edge 153 of plate 31 is slidably received. The groove 156 thus provides a bearing to resist downward forces tending to deflect the swing plate downward. If desired, a compression spring 157 may also be employed on stud 154 between nut 155 and a shoulder 158, provided at a portion 159 of the stud which is of enlarged diameter, so that the vertical adjustment of the nut may be preserved.

The stud 154 also performs the function of providing bearing support for a control arm 160 (Figs. 10 and 17) to govern, with other parts, the position of the pickup arm. This is effected as follows: Stud 154 includes a portion 161 of considerably enlarged diameter, at the base plate, from which a bearing section 162, of reduced diameter, is in extension, a shoulder 163 being thereby provided. The control arm 160 is confined between the shoulder 163 and a washer 164 while a C-washer 165, beside washer 164, pinches section 162 at an annular groove 166 in said section to lock the control arm against displacement axially of stud 154.

The control arm 160 is adapted to cooperate with the actuator mechanism 116 for control of the pickup arm. To do so, arm 160 is biased clockwise (Fig. 10) about stud 154 by a tension spring 167 which is anchored to a lug 168, on the control arm, and to the base plate 2. The control arm 160 extends over the swing plate 31, from which a stop pin 169 extends upward (Fig. 17), in a plane above the level of arm 160. During the process of reproducing a record, engagement of pin 169 with arm 160 is adequate to hold said arm against the force of spring 167. While arm 160 is so retained, a pin 171, in upward extension from a continuation 172 of arm 139 into the plane of arm 160, is free to be carried about the axis of lift rod 42 without interference by control arm 160. This condition obtains when the pickup arm is tracking a record. When, however, a cycle of operation of the swing plate 31 is initiated, the pin 169 is carried counterclockwise (Fig. 10) about the axis of the swing plate, thereby removing the obstruction to movement of the arm 160. During the course of its consequent movement clockwise by spring 167, the arm 160 remains in engagement with pin 169 until said arm strikes pin 171 on the carrier arm 139. Thereupon pin 169 is carried away from arm 160 for the remainder of the first half of the cycle of swing plate 31. During this period, the sequency of additional operations is as follows: The lower extremity of lift rod 42 is moved from the level of dwell 41 (Fig. 13) to the level of the top of swing plate 31, pickup arm 32 being thus supported in its extreme upward position. Subsequent to this operation and before plate 31 has been swung to its extreme position depicted in Fig. 5, a contactor pin 173, in upward extension from the swing plate and in length equal to pin 169, strikes the carrier arm 139 to swing mechanism 116 clockwise (Fig. 10 and, concurrently to swing the pickup arm outwardly so that a replacement record may be transferred from the magazine to the turntable. Also, during clockwise motion of actuator mechanism 116 the pin 171 slides against a cam surface 174 on the control arm 160. The surface 174 is of such a curvature and so disposed with respect to the stud 154 that when pressure of pin 173, against carrier arm 139 is relieved, during the second half of the cycle of operation of swing plate 31, the force of spring 167 is adequate to swing the pickup arm inwardly; that is, counterclockwise. As the pickup arm is so swung, pin 171, of course, rides against cam surface 174 in a direction toward the stud 154. This motion is arrested, however, by a heel surface 176 which catches and holds pin 171 when the pickup arm is in the proper let-down position. In the course of the remaining half of the cycle of motion of the swing plate, the dwell portion 41 of the lift cam is carried under lift rod 42 thereby providing for downward movement of the pickup arm, by gravity, into engagement with the beginning of the sound groove of the record. Just before the record is engaged by the pickup arm, however, pin 169 is again carried into engagement with the control arm 160 so that thereby said arm is moved out of engagement with pin 171 and freedom of motion of the pickup arm to track the record is thus again provided.

During the period in which the pickup arm is automatically operated from the swing plate 31 and control arm 160, friction of engagement between the cam surface 174 and pin 171 is adequate to dampen any tendency on the part of the pickup arm to swing freely.

When grasped and moved outwardly from any of its record reproducing positions, the pickup arm can be moved only to a point governed by abutment of pin 171 with a hook surface 177, defining a second limit of the cam surface 174. This is slightly farther than the pin 171 is moved when it is automatically manipulated.

Having thus described my invention thereof, I am aware that numerous and extensive departures may be made therefrom without departing from the spirit or scope of my invention.

I claim:

1. In an automatic phonograph apparatus comprising a base plate for support of a driven turntable having a hub thereon a magazine and a pickup arm, the combination of, a swing plate from which the pickup arm is adapted to be manipulated and the magazine actuated to release a record therefrom to the turntable, a pivot member to pivotally couple the swing plate to the base plate thereby providing a vertical axis for said swing plate, a bearing in spaced relationship to said vertical axis on said swing plate, a shaft in said bearing, and a resilient tired wheel mounted on the shaft, said shaft being coupled to the wheel at a point eccentric to the center thereof, the axis of the shaft being normally between the center of the wheel and the turntable hub to provide clearance between the periphery of said wheel and said hub, said wheel being adapted to be swung into engagement with said hub to provide driving relationship therebetween for cyclical swinging of said swing plate about said pivot member to rock the pickup arm and release a record from said magazine means to the turntable.

2. In a record player comprising a base plate on which is supported a pickup arm, drive means and a driven turntable above the level of which magazine means is adapted to support a supply of unplayed records, the combination of, a movable element to manipulate the pickup arm and release a record from the magazine, said element being movably anchored to the base plate, an eccentric member rotatably supported from said movable element and arranged to be cyclically connected and rotated from said drive means to move said movable element, said eccentric member being normally disengaged from said drive means, mechanism in connection with the pickup arm and arranged to engage the eccentric member by which motion of said pickup arm at the terminal groove of a record on the turntable is communicated to the eccentric member to initiate driving communication between said eccentric member and said drive means, and an auxiliary drive member carried by said eccentric member arranged to engage the drive member upon movement of the eccentric member and to initiate driving relationship between said eccentric member and said drive means until said eccentric member is rotated to its engaged position.

3. In a record player comprising a base plate on which is supported a pickup arm and a driven turntable having a hub thereon above the level of which magazine means is adapted to support a supply of unplayed records, the combination of, a swingable element connected to and by which the pickup arm and magazine means is manipulated and the magazine means operated to release a record to the turntable, pivotal means by which said element is pivoted to the base plate, an eccentric member, rotatably supported from said swingable element and arranged to be cyclically rotated by engagement with said turntable hub to swing said swingable element, said eccentric member being normally disengaged from said hub, mechanism in connection with the pickup arm and eccentric member by which motion of said pickup arm at the terminal groove of a record on the turntable is communicated to the eccentric member to move it and initiate driving communication between said eccentric member and said hub when said eccentric member is in a predetermined position, and an auxiliary drive member pivotally carried by said eccentric member and having a curved portion extending beyond the edge of the eccentric wheel arranged to engage said hub when said eccentric member is rotated by the pickup arm, said auxiliary drive member being adapted to maintain driving relationship between said eccentric member and said hub until said eccentric member is rotated to its driven position.

4. In a record player comprising a base plate on which is supported a pickup arm and a driven turntable having a hub thereon above the level of which magazine means is adapted to support a supply of unplayed records, the combination of, means including a swing plate by which the pickup arm is adapted to be manipulated and the magazine means actuated to release a record to the turntable, said swing plate being in pivotal relationship to the base plate, an eccentric wheel rotatably supported from said swing plate and arranged for engagement with the turntable hub to be rotated cyclically from said turntable hub and to swing said swing plate, a crank arm in rigid connection with said eccentric wheel, mechanism in connection with the pickup arm adapted to engage with said crank arm by which motion of said pickup arm at the terminal groove of a record on the turntable is adapted to be communicated to said crank arm to move it and the eccentric wheel to initiate driving communication between said wheel and said hub, and means comprising a curved lever carried by the wheel and having a cushioned supplementary drive surface, said cushioned surface normally extending beyond the periphery of the wheel and disposed for engagement with said hub as said wheel is rotated, said surface being frictionally engaging the hub to maintain a supplemental driving relationship between said wheel and said hub until said wheel engages with the hub.

5. In a record player comprising a base plate on which is supported a pickup arm and a driven turntable having a hub thereon above the level of which magazine means is adapted to support a supply of unplayed records, the combination of, a swing plate by which the pickup arm is adapted to be manipulated and the magazine means actuated, pivotal means by which the swing plate is in pivotal relationship to the base plate, an eccentric wheel rotatably supported from said swing plate and adapted to be rotated cyclically by said turntable hub to swing said swing plate, a crank arm in rigid connection with said eccentric wheel, mechanism in connection with the pickup arm adapted to cooperate with said crank arm by which motion of said pickup arm at the terminal groove of a record on the turntable is adapted to be communicated to said crank arm to initiate driving communication between said wheel and said hub, a movable member anchored to said wheel, resilient means in connection with the movable member to bias a portion of said movable member outwardly of and beyond the periphery of said wheel, said movable member being adapted to be carried into driving relationship with the turntable hub as said wheel is rotated through a cycle of motion, said movable member being adapted to provide driving communication between said hub and said wheel after said wheel has been disengaged from said hub, driving communication between said movable member and said hub then being adapted to be interrupted when said crank arm has been thereby swung to its initial position.

6. In a record player comprising a base plate on which is supported a pickup arm and a driven turntable having a hub thereon above the level of which magazine means is adapted to support a supply of unplayed records, the combination of, means including a movable plate to manipulate the pickup arm and release a record from the magazine, support means by which the movable plate is in reciprocable relationship to the base plate, an eccentric wheel rotatably supported from said movable plate and adapted to be cyclically rotated from said turntable hub to reciprocate said movable plate, a manually movable lever pivoted to said base plate, resilient means to bias said lever to a predetermined position, follower means in connection with said lever, said follower means being adapted to engage said wheel as said lever is swung away from its predetermined position to initiate driving communication between said wheel and said hub.

7. In an automatic record player having a base plate, operating mechanism mounted on said plate, and a normally disengaged eccentric wheel for driving the operating mechanism, manual record rejecting means comprising a manually movable lever pivoted on said base plate, follower means mounted on said lever adapted to engage said wheel upon movement of said lever to initiate the driving engagement of said wheel.

8. In a record player comprising a frame for support of a pickup arm and a driven turntable having a hub thereon, the pickup arm being adapted to swing over the turntable to reproduce a record of either of two classes when it has been delivered to the turntable from magazine means thereabove, the combination of, means including a swing plate pivoted to the frame to provide, by swinging motion thereof, sequential manipulation of the pickup arm and release of a record from the magazine, resilient means coupled to said frame and swing plate to bias said plate to a predetermined position with respect to said frame, an eccentrically-mounted wheel supported from said swing plate and cooperatively associated with the turntable hub, said wheel being normally disengaged from said hub when said swing plate is in its predetermined position, a crank arm drivingly coupled to said wheel, a driving link pivoted to said wheel, means in connection with said wheel by which said link is resiliently pressed outwardly of the periphery of said wheel, said link being adapted to be depressed when said wheel is in driving engagement with said hub to provide for sudden interruption in driving relationship between the hub and wheel at a predetermined point to position the crank arm in a predetermined position with respect to the frame when said swing plate is in its predetermined position, an actuator mechanism coupled to the pickup arm and adapted to swing laterally therewith, said actuator mechanism being adapted to be swung into engagement with said crank arm when the pickup arm is carried to the terminal groove of a record it is tracking, movement of said crank arm by said mechanism providing for driving engagement of said drivable member with the turntable hub to thereby provide cyclic movement of said swing plate with respect to its predetermined position.

9. In a record player comprising a frame for support of a driven turntable and a pickup arm, the pickup arm being adapted to swing over the turntable to reproduce a record of either of two classes when it has been released to the turntable from magazine means thereabove, the combination of, means including a swingable element pivoted to the frame to provide, by swinging motion thereof, sequential manipulation of the pickup arm and release of a record from the magazine, resilient means coupled to said frame and swingable element to bias said element to a predetermined position with respect to said frame, clutch means including an eccentrically-mounted drivable member supported from said swingable element and adapted to be rotated into driving association with said turntable, said drivable member being normally disengaged from said turntable when said swingable element is in its predetermined position, a contactable arm drivingly coupled to said drivable member and adapted to occupy a predetermined position with respect to said frame when said swingable element is in its predetermined position, an actuator mechanism including a carrier arm coupled to said pickup arm and adapted to swing horizontally therewith, an adjustable arm movably anchored to the carrier arm, and adjustment means for each one of said arms with respect to the other arm, said actuator mechanism being adapted to be swung into engagement with said contactable arm to move it and thereby to move said drivable member into driven relation with said turntable.

10. In a record player comprising a frame for support of a driven turntable and a pickup arm, the pickup arm being adapted to swing over the turntable to reproduce a record of either of two classes when it has been released to the turntable from magazine means thereabove, the combination of, a swingable element pivoted to the frame to provide, by swinging motion thereof, sequential manipulation of the pickup arm and release of a record from the magazine, resilient means coupled to said frame and swingable element to bias said element to a predetermined position with respect to said frame, clutch means including an eccentrically-mounted drivable member supported from said swingable element and adapted to be rotated into driving association with said turntable, said drivable member normally being disengaged from said turntable when said swingable element is in its predetermined position, a contactable arm drivingly coupled to said drivable member and adapted to occupy a predetermined position with respect to said frame when said drivable member is disengaged, an actuator mechanism including a carrier arm coupled to said pickup and adapted to swing horizontally therewith, an adjustable arm in pivotal relationship to said carrier arm, adjustment means in connection with both of said arms by which said adjustable arm is adapted to be turned about said pivot means, contactor arm means pivoted to said adjustable arm, resilient means anchored to said carrier arm to bias said contactor arm means to a normal position, said contactor arm means being adapted to engage said contactable arm when the pickup arm follows the trip groove of a record it is tracking to swing said drivable member into driving communication with the turntable and thereby cyclically operate said swingable element, and a cam surface on said contactable arm adapted to engage said contactor arm means and pivot it on said adjustable arm away from its normal position, said contactable arm being formed to pass said contactor arm means in its pivoted position in passing through a cycle of motion if motion of said contactable arm is impeded by said contactor arm means.

11. In an automatic record changer comprising a base plate for support of a driven turntable and a pickup arm adapted to swing about a vertical axis, the pickup arm being cooperatively associated with the turntable, above the level of which magazine means is adapted to support a supply of unplayed records for successive release to the turntable, the combination of, a movable element pivoted to the base plate, movement of the movable element being adapted to actuate the magazine means to release a record to the turntable, an eccentrically-mounted wheel supported on said element, said wheel being normally out of engagement with the turntable but adapted to be swung into driving engagement with the turntable to move said movable element through a cycle of motion, a vertically effective cam on said movable element at the vertical axis of said pickup arm, means including a vertical lift pin adapted to engage said cam to rock said pickup arm vertically when said cam is carried horizontally by motion of the movable element, screw adjustment means anchored to the base plate and cooperatively associated with said movable element adjacent said cam, adjustment of said adjustment means being adapted through said cooperative association, to adjust the vertical position of said movable element and therefore of said cam, and thereby to govern the height to which said pickup arm is adapted to be rocked vertically.

12. In an automatic record changer comprising a base plate for support of a driven turntable and a pickup arm adapted to swing about a vertical axis, the pickup arm being cooperatively associated with the turntable above the level of which magazine means is adapted to support a supply of unplayed records for successive release to the turntable, the combination of, a movable plate mounted for movement on the base plate, movement of the movable plate being adapted to actuate the magazine means to release a record to the turntable, an eccentrically-mounted wheel supported on said movable plate, said wheel being normally out of engagement with the turntable but adapted to be swung into driving engagement with the turntable to move said movable plate through a cycle of motion, a vertically effective cam on said movable plate at the vertical axis of said pickup arm, means including a vertical lift pin adapted to engage said cam to rock said pickup arm vertically when said cam is carried horizontally by motion of the movable plate, an externally threaded adjustment member, an internally threaded adjustment member threaded on said externally threaded member, one of said threaded members being coupled to the base plate, the other of the threaded members having an annular groove adapted to embrace opposite sides of the movable plate's edge near said cam to provide for adjustment of the height to which the lift pin is adapted to be moved axially and thereby the elevation to which the pickup arm is adapted to be elevated when said movable plate is moved through a cycle of motion, and means in connection with one of the threaded members by which the adjustment between said threaded members is adapted to be preserved.

13. In a record player comprising a base plate on which is mounted a driven turntable and a pickup arm to cooperate with the turntable for reproducing a record thereon, mechanism including a movable element movably anchored to the base plate in response to movement of which the pickup arm is adapted to be swung outwardly over the record, an actuator mechanism coupled to said pickup arm and adapted to swing horizontally therewith, means including a vertically effective cam on said movable element by which the pickup arm is supported in a raised position while said pickup arm is being swung outwardly, a positioning element pivoted to the base plate, a positioning cam on the positioning element, biasing means in connection with said positioning element to urge said cam surface into engagement with the actuator mechanism for swinging the pickup arm inwardly, and an abutment surface in connection with the cam surface on said positioning element to limit movement of the actuator mechanism over said cam surface and thereby to arrest inward movement of the pickup arm at a point over the beginning of the sound groove of a record on the turntable, movement of said vertical motion cam then providing for downward rocking motion of said pickup arm from its raised position into engagement with the beginning of a record.

14. In a record player comprising a base plate on which is mounted a driven turntable and a pickup arm to cooperate with the turntable for reproducing a record thereon, mechanism by which the pickup arm is adapted to be moved from the trip groove of the record outwardly beyond a region above the peripheral edge of the record and then inwardly to engage the beginning of the sound groove of the record comprising a movable element mounted in movable relationship to said base plate, means coupled to the movable element to bias said element to a predetermined position, clutch means including an eccentric driveable member rotatably supported from said movable element, said drivable member normally being in disengaged relationship to the turntable when said movable element is in its predetermined position, actuator means coupled to said pickup arm and adapted to swing horizontally therewith, means in connection with said drivable member, and cooperating means in connection with said actuator means by which driving communication is adapted to be established between said turntable and said drivable member to move said movable element through a cycle of motion with respect to its predetermined position when the pickup arm reaches the trip groove of the record it is tracking, means including a vertically effective cam on said movable element to rock the pickup arm upwardly to a raised position when the movable element is moved away from its predetermined position, a positioning element movably anchored to the base plate, a positioning surface on the positioning element, biasing means in connection with said positioning element to urge said positioning surface into engagement with the actuator means for swinging the pickup arm inwardly, an abutment surface in connection with the movable element to hold said positioning surface out of engagement with said actuator means by engagement with said positioning element when said movable element is in its predetermined position to allow tracking of a record by the pickup arm, a contactor surface in connection with said movable element to engage the actuator means and thereby swing the pickup arm outwardly when in its raised position and when said movable element is moved in one direction through a cycle of motion, said abutment surface then being removed from engagement with said positioning element to provide for inward movement of the pickup arm by engagement of said cam surface with said actuator means when the movable element is moved in the other direction of its cycle of motion, and a stop surface in connection with the positioning surface on said positioning element to arrest inward movement of the pickup arm by cooperation with said actuator mechanism, inward movement of said pickup arm being thereby arrested over the beginning of the sound groove of a record on the turntable, movement of said vertical motion cam then providing for downward rocking motion of said pickup arm from its raised position into engagement with the beginning of a record.

15. In a record player comprising a base plate on which is mounted a driven turntable and a pickup arm to cooperate with the turntable for reproducing a record thereon, mechanism by which the pickup arm is adapted to be moved from the trip groove of the record outwardly beyond a region above the peripheral edge of the record and then inwardly to engage the beginning of the sound groove of the record including a movable plate movably mounted on said base plate, means coupled to the movable plate to bias said plate in its mounting to a predetermined position, clutch means including an eccentric drivable member rotatably supported from said movable plate, said drivable member normally being in disengaged relationship to the turntable when said movable plate is in its predetermined position, an actuator mechanism coupled to said pickup arm and adapted to swing horizontally therewith, means in connection with said drivable member, and cooperating means in connection with said actuator mechanism by which driving communication may be established between said turntable and said drivable member to move said movable plate through a cycle of motion with respect to its predetermined position when the pickup arm reached the trip groove of a record, means including a vertically effective cam on said movable plate to rock the pickup arm upwardly to a raised position when the movable plate is moved away from its predetermined position, a positioning element pivoted to the base plate, a cam surface on the positioning element, biasing means in connection with said positioning element to urge said cam surface into engagement with the actuator mechanism for biasing the pickup arm inwardly, an abutment member carried by the movable plate to hold said cam surface out of engagement with said actuator mechanism by engagement with said positioning element when said movable element is in its predetermined position to allow for tracking of a record by the pickup arm, a contactor member carried by said movable plate to engage the actuator mechanism when said movable plate is moved away from its predetermined position and thereby swing the pickup arm outwardly when in its raised position provided by said vertically effective cam, said abutment member then being removed from engagement with said positioning element to provide for inward movement of the pickup arm by engagement of said cam surface with said actuator mechanism when the movable plate is moved toward its predetermined position, and a heel surface in connection with the cam surface to arrest inward movement of the pickup arm by cooperation of said heel with said actuator mechanism, inward movement of said pickup arm being thereby adapted to be arrested over the beginning of the sound groove of a record on the turntable, movement of said vertical motion cam then providing for downward rocking motion of said pickup arm from its raised position into engagement with the beginning of a record.

References Cited in the file of this patent

UNITED STATES PATENTS

| Number | Name | Date |
|---|---|---|
| 1,568,130 | Blackwell | Jan. 5, 1926 |
| 2,198,294 | Rich | Apr. 23, 1940 |
| 2,289,357 | Green | July 14, 1942 |
| 2,328,052 | Butler | Aug. 31, 1943 |
| 2,331,383 | Faulkner | Oct. 12, 1943 |
| 2,394,539 | Erwood et al. | Feb. 12, 1946 |
| 2,435,264 | Ansar | Feb. 3, 1948 |
| 2,536,432 | Faulkner | Jan. 2, 1951 |